United States Patent
Fang et al.

(10) Patent No.: US 10,719,602 B2
(45) Date of Patent: Jul. 21, 2020

(54) METHOD AND DEVICE FOR REALIZING SESSION IDENTIFIER SYNCHRONIZATION

(71) Applicant: Alibaba Group Holding Limited, Grand Cayman (KY)

(72) Inventors: Qiang Fang, Hangzhou (CN); Chao Duan, Hangzhou (CN)

(73) Assignee: Alibaba Group Holding Limited, Gran Cayman (KY)

( * ) Notice: Subject to any disclaimer, the term of this patent is extended or adjusted under 35 U.S.C. 154(b) by 118 days.

(21) Appl. No.: 15/963,028

(22) Filed: Apr. 25, 2018

(65) Prior Publication Data

US 2018/0247049 A1    Aug. 30, 2018

Related U.S. Application Data

(63) Continuation of application No. PCT/CN2016/102323, filed on Oct. 18, 2016.

(30) Foreign Application Priority Data

Oct. 26, 2015  (CN) .......................... 2015 1 0702527

(51) Int. Cl.
 *G06F 21/00*  (2013.01)
 *G06F 21/45*  (2013.01)
 (Continued)

(52) U.S. Cl.
 CPC ............ *G06F 21/45* (2013.01); *H04L 9/0643* (2013.01); *H04L 9/0822* (2013.01);
 (Continued)

(58) Field of Classification Search
 CPC ... G06F 21/45; G06F 2221/2137; H04L 9/32; H04L 63/0861; H04L 63/083;
 (Continued)

(56) References Cited

U.S. PATENT DOCUMENTS

| 8,973,113 B1 | 3/2015 | Eatough |
| 2006/0070114 A1 | 3/2006 | Wood et al. |

(Continued)

FOREIGN PATENT DOCUMENTS

| CN | 101316169 A | 12/2008 |
| CN | 101583112 A | 11/2009 |

(Continued)

OTHER PUBLICATIONS

Translation of Chinese Office Action pp. 3-8 and Search Report from corresponding CN Patent Application No. 201510702527.3, 5 pages.

(Continued)

*Primary Examiner* — Mohammad W Reza
(74) *Attorney, Agent, or Firm* — Lee & Hayes, P.C.

(57) ABSTRACT

A method and an apparatus for realizing session identifier synchronization are provided. The method includes initiating a first request for logging into an application program to a server, the first request including a first session identifier, the first session identifier being generated from a login account and an original password of the application program; performing a validity verification on a user of a terminal and sending a verification result that is obtained to the server to allow the server to perform a check on the verification result if the first session identifier is determined to be invalid by the server; and receiving a second session identifier from the server and storing the second session identifier into the terminal if the verification result is verified and approved by the server, the second session identifier being generated from the login account and a new password.

15 Claims, 16 Drawing Sheets

(51) Int. Cl.
*H04L 9/32* (2006.01)
*H04L 9/06* (2006.01)
*H04L 9/08* (2006.01)
*H04L 29/06* (2006.01)

(52) U.S. Cl.
CPC .............. *H04L 9/0825* (2013.01); *H04L 9/32* (2013.01); *H04L 9/3231* (2013.01); *H04L 63/083* (2013.01); *H04L 63/0861* (2013.01); *G06F 2221/2137* (2013.01)

(58) Field of Classification Search
CPC ... H04L 9/3231; H04L 9/0825; H04L 9/0822; H04L 9/0643; H04L 67/146; H04L 67/12; H04L 9/0631
USPC .......................................................... 713/186
See application file for complete search history.

(56) References Cited

U.S. PATENT DOCUMENTS

| | | |
|---|---|---|
| 2009/0210938 A1 | 8/2009 | Childress et al. |
| 2014/0165147 A1 | 6/2014 | Hershberg et al. |
| 2014/0331060 A1 | 11/2014 | Hayton |
| 2016/0063479 A1* | 3/2016 | Duan .................... G06Q 20/32 705/44 |
| 2017/0134357 A1* | 5/2017 | Ohlsson ................ H04L 67/141 |

FOREIGN PATENT DOCUMENTS

| | | |
|---|---|---|
| CN | 101594350 | 12/2009 |
| CN | 102469074 A | 5/2012 |
| CN | 102882903 A | 1/2013 |
| CN | 103618604 | 3/2014 |

OTHER PUBLICATIONS

The Extended European Search Report dated May 27, 2019 for European patent Application No. 16858931.5, 7 pages.
Translation of International Search Report from corresponding PCT application No. PCT/CN2016/102323 dated Jan. 5, 2017, 2 pages.
Translation of Written Opinion from corresponding PCT application No. PCT/CN2016/102323 dated Jan. 5, 2017, 6 pages.

* cited by examiner

METHOD AND DEVICE FOR REALIZING SESSION IDENTIFIER SYNCHRONIZATION

CROSS REFERENCE TO RELATED PATENT APPLICATIONS

This application claims priority to and is a continuation of PCT Patent Application No. PCT/CN2016/102323 filed on 18 Oct. 2016, and is related to and claims priority to Chinese Patent Application No. 201510702527.3, filed on 26 Oct. 2015, entitled "Method and Device for Realizing Session Identifier Synchronization," which are hereby incorporated by reference in their entirety.

TECHNICAL FIELD

The present disclosure relates to the technological field of network security, and particularly to methods and apparatuses for realizing session identifier synchronization.

BACKGROUND

Along with the continuous development of embedding technologies and terminal technologies, an increasing number of terminal devices are being applied in the daily working lives of the people. Application programs that are installed in terminal devices are also designed with a number of different types of versions to be suitable to be used in different operating systems, such as Windows, Linux, Android, iOS, etc. When a user access application programs on different terminal devices using an account thereof, a problem of identity verification of the account arises. In order to prevent the user from repeatedly inputting identity verification information, many application programs are incorporated with a password recording function. However, after a user resets a password associated with an application program on one of terminal devices, the user needs to input a new password for that application program when the user needs to log into the application program through other terminal devices as the passwords previously recorded in the other terminal devices have become invalid. In some scenarios, inputting a new password through another terminal device may not be convenient for a user. For example, for a user working on other tasks, inputting a new password into a terminal device when both hands are occupied will create certain security risks.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Accordingly, the present disclosure provides a new technical solution, which can allow a user to log into an application program on other terminals without the need of re-entering a new password, and ensure the login security of the application program.

In order to achieve the aforementioned goals, the present provides the following technical solution.

In implementations, a method for realizing a password synchronization is provided, which includes initiating a first request for logging into an application program to a server, the first request including a first session identifier, the first session identifier being generated from a login account and an original password of the application program, and the original password being a login password corresponding to the login account prior to modification; performing a validity verification on a user of a terminal and sending a verification result that is obtained to the server to allow the server to perform a check on the verification result if the first session identifier is determined to be invalid by the server; and receiving a second session identifier from the server and storing the second session identifier into the terminal if the verification result is verified and approved by the server, the second session identifier being generated from the login account and a new password, and the new password being a login password corresponding to the login account after the modification.

In implementations, a method for realizing a password synchronization is provided, which includes verifying validity of a first session identifier included in a first request for logging into an application program when the first request is initiated in a terminal, the first session identifier being generated from a login account and an original password of the application program, and the original password being a login password corresponding to the login account prior to modification; instructing the terminal to perform a validity verification on a user of the terminal if the first session identifier is verified to be invalid; receiving a verification result of the validity verification of the user from the terminal; and sending a second session identifier to the terminal if the verification result is verified and approved by a server, the second session identifier being generated from the login account and a new password, and the new password being a login password corresponding to the login account after the modification.

In implementations, an apparatus for realizing a password synchronization is provided, which includes a first sending module used for initiating a first request for logging into an application program to a server, the first request including a first session identifier, the first session identifier being generated from a login account and an original password of the application program, and the original password being a login password corresponding to the login account prior to modification; a first verification module used for performing a validity verification on a user of a terminal and sending a verification result that is obtained to the server to allow the server to perform a check on the verification result if the first session identifier sent by the first sending module is determined to be invalid by the server; and a first receiving module used for receiving a second session identifier from the server and storing the second session identifier into the terminal if the verification result that is obtained by the first verification module is verified and approved by the server, the second session identifier being generated from the login account and a new password, and the new password being a login password corresponding to the login account after the modification.

In implementations, an apparatus for realizing a password synchronization is provided, which includes a second verification module used for verifying validity of a first session identifier included in a first request for logging into an application program when the first request is initiated in a terminal, the first session identifier being generated from a login account and an original password of the application program, and the original password being a login password corresponding to the login account prior to modification; a commanding module used for instructing the terminal to perform a validity verification on a user of the terminal if the first session identifier is verified by the second verification module to be invalid; a third receiving module used for receiving a verification result of the validity verification of the user that is performed by the terminal according to an instruction of the commanding module; and a third sending module used for sending a second session identifier to the terminal if the verification result that is received by the third receiving module is verified and approved by a server, the second session identifier being generated from the login account and a new password, and the new password being a login password corresponding to the login account after the modification.

As can be seen from the above technical solution, the present disclosure can allow a user to log into an application program through a second session identifier, thus avoiding the user who uses a terminal from re-entering a new password to log into the application program, and greatly improving the user experience for logging into the application program. When a large number of users need to reset login passwords associated with application programs, the workload of a server related to verification of user legitimacy can be reduced by performing validity verifications of the users on the terminal side, thus avoiding the waste of resources of the server.

DETAILED DESCRIPTION

Exemplary embodiments are described in detail herein, with examples being represented in accompanying drawings. When accompanying drawings are involved in the following description, the same numerals in different accompanying drawings represent the same or similar elements unless stated otherwise. Implementations described in the following exemplary embodiments represent merely some and not all of the implementations that are consistent with the present disclosure, and are examples of methods and apparatuses that are consistent with aspects of the present disclosure which are described in detail in appended claims.

Terms used in the present disclosure are merely used for the purpose of describing specific embodiments, and are not intended to limit the present disclosure. Singular forms—"a type", "said", and "the" that are used in the present disclosure and the appended claims are intended to include plural forms, unless other meanings are clearly expressed in a context. A term "and/or" used in the specification refers to and includes any or all possible combinations of one or more associated items that are listed.

It should be understood that terms such as "first", "second" and "third" may be used in the present disclosure to describe various types of information, these pieces of information are not limited to these terms. These terms are merely used to distinguish between information of a same type. For example, without departing the scope of the present disclosure, a first piece of information can also be called as a second piece of information. Similarly, a second piece of information can also be called as a first piece of information. Depending on the context, a phrase "if" that is used herein may be interpreted as "in an event that", "when", or "in response to".

Figure 1:
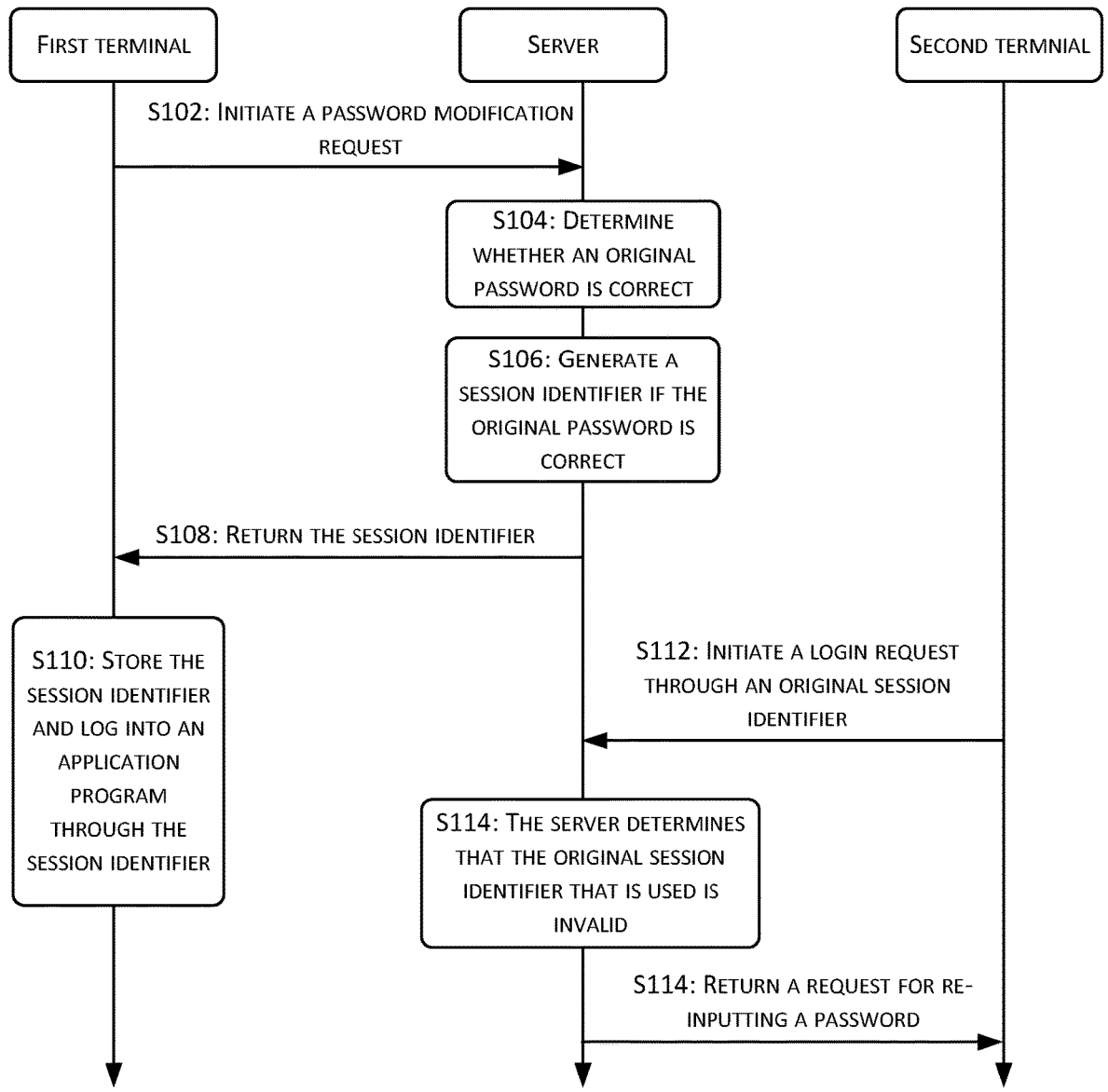
FIG. 1 is a flowchart illustrating a process of modifying a login password associated with an application program through a first terminal.

FIG. 1 is a flowchart illustrating a process 100 of modifying a login password associated with an application program through a first terminal. Before an original password is modified, a first terminal and a second terminal both avoid the need of inputting a login password each time when an application program is logged in through a function of recording passwords. If a user modifies the original password of the application program through the first terminal, a login failure occurs when the second terminal still uses the original password that is recorded to log into the application program because the login password has been modified. As shown in FIG. 1, the following operations are included.

At S102, a first terminal sends a password modification request to a server, and provides information that is needed for password modification, e.g., a login account, an original password, and a new password, etc., to the server.

At S104, the server performs a check on the provided information, and verifies whether the original password is correct. S102 is performed again to instruct a user to resend a password modification request to the server through the first terminal if the original password is incorrect. S106 is performed if the original password is correct.

At S106, the server stores the new password in a backend database, generates a new session identifier based on the login account and the new password, and sets an original session identifier that is generated based on the login account and the original password to be invalid.

At S108, the new session identifier is returned to the first terminal.

At S110, the first terminal receives the new session identifier returned by the server, and stores the new session identifier into a local secure space of the first terminal to complete a process of modifying a password of an application program of the first terminal.

At S112, after the server modifies the password, a second terminal initiates a login request to the server using the original session identifier, wherein the second terminal records the original session identifier in the second terminal through a manner of password recording after an application program is first logged in therein.

At S114, the server performs verification on the original session identifier of the second terminal, determines that the original session identifier that is used has been invalid, and returns a request for re-inputting a password to the second terminal. Under this circumstance, the second terminal needs to input the new password that has been modified again. When both hands of the user are occupied, inputting the new password through the second terminal may result in certain security risks.

Accordingly, the present disclosure uses the following embodiments to enable the second terminal to log into the server without the need of inputting the new password after the login password is modified in the first terminal, thus resolving the deficiencies of existing technologies that the new password is needed to be inputted in order to log into the server providing the application program when the user needs to log into the application program through the second terminal.

The following embodiments are provided for describing the present disclosure in further detail.

Figure 2:
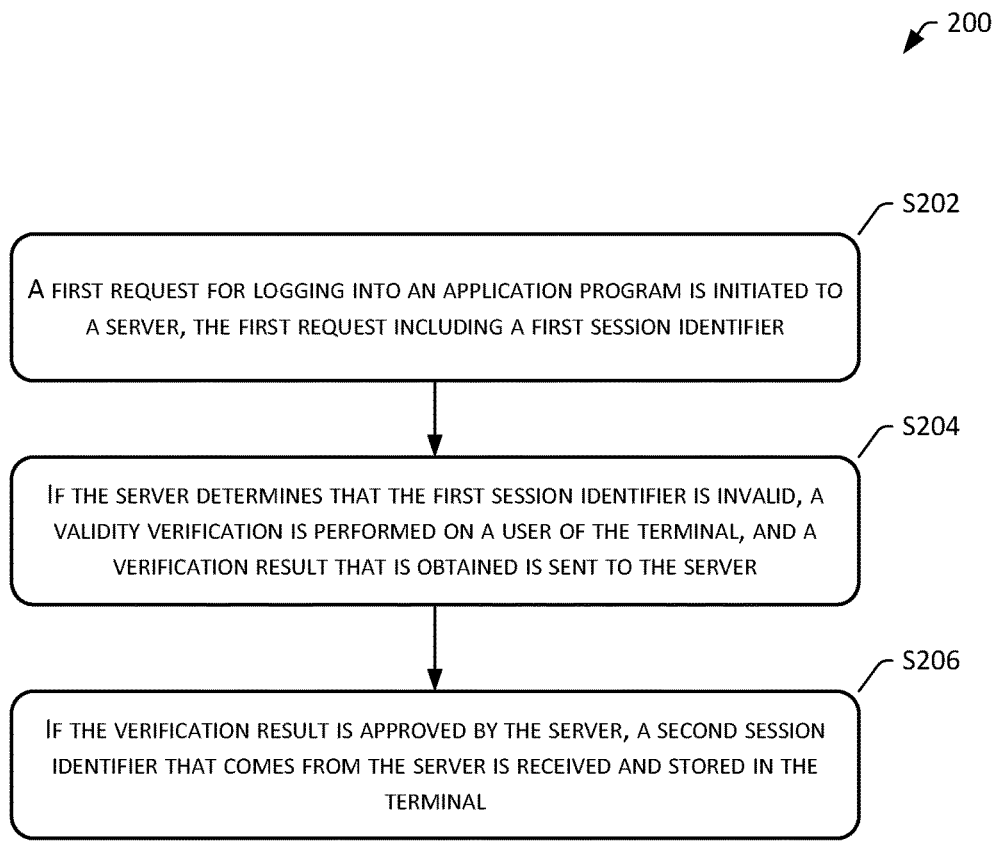
FIG. 2 is a flowchart illustrating a first exemplary method for realizing session identifier synchronization in accordance with an embodiment of the present disclosure.

FIG. 2 is a flowchart illustrating a first exemplary method 200 for realizing session identifier synchronization in accordance with an embodiment of the present disclosure. A terminal on which the method 200 is applied is the second terminal as shown in FIG. 1. As shown in FIG. 2, the following operations are included.

S202: A first request for logging into an application program is initiated to a server, the first request including a first session identifier, the first session identifier being generated from a login account and an original password of the application program, and the original password being a login password corresponding to the login account before modification.

In some embodiments, when an application program is logged in for the first time, a terminal can send a character string corresponding to a first session identifier to a server through a manner of password recording, and can record the first session identifier in a first terminal locally. When the application program is logged in again, the terminal can log into the application program using the recorded first session identifier, thus enabling a user to avoid an operation of re-inputting a login password. In some embodiments, a method of generating a first session identifier can be determined by the server. A first session identifier can be generated based on a login account and an original password of a user using a hash algorithm such as md5 or sha1, etc. For example, based on a login account and an original password as zhangxiao and zx098, and a login timestamp as 20151026, a first session identifier (3EC3ED381B9CF4359F4C1CB02CDF64) is obtained through a md5 algorithm by performing a hash calculation of the MD5 algorithm on the login account, the original password and the timestamp.

S204: If the server determines that the first session identifier is invalid, a validity verification is performed on a user of the terminal, and a verification result that is obtained is sent to the server, to allow the server to perform a check on the verification result.

In some embodiments, the validity verification may be performed using a biological characteristic of the user of the terminal. For example, a validity verification local to a terminal may be performed on a user using biological characteristics such as a fingerprint, an iris, a human face, etc., of the user. In some embodiments, before the terminal sends the verification result to the server, the verification result and a random number corresponding to the verification result can be encrypted using a symmetric secret key of the server. The encrypted verification result is sent to the server, thereby ensuring that the verification result is not illegally intercepted and manipulated during a transmission process, and ensuring the security of the verification result transmitted between the terminal and the server.

S206: If the verification result is approved by the server, a second session identifier that comes from the server is received and stored in the terminal, the second session identifier being generated from the login account and a new password, and the new password being a login password corresponding to the login account after the modification.

In embodiments, in order to prevent the second session identifier from being illegally intercepted and manipulated during a transmission process, the second session identifier can be encrypted using a public key of the terminal. After receiving the encrypted second session identifier, the terminal decrypts the encrypted second session identifier using a private key of the terminal to obtain the second session identifier. In some embodiments, a method of generating the second session identifier can be referenced to the above method of generating the first session identifier. For example, after the user changes the login password to zhangxiao using the first terminal in the embodiment shown in FIG. 1, a second session identifier (2EF430338DF56A6FE40819CBF75982A9) is obtained using the same hash calculation for the first session identifier.

Through S202-S206, the user can log into the application program using the second session identifier, and the user who uses the terminal is avoided from re-inputting the new password to log into the application program, thus greatly improving the login experience of the application program of the user.

Figure 3A:
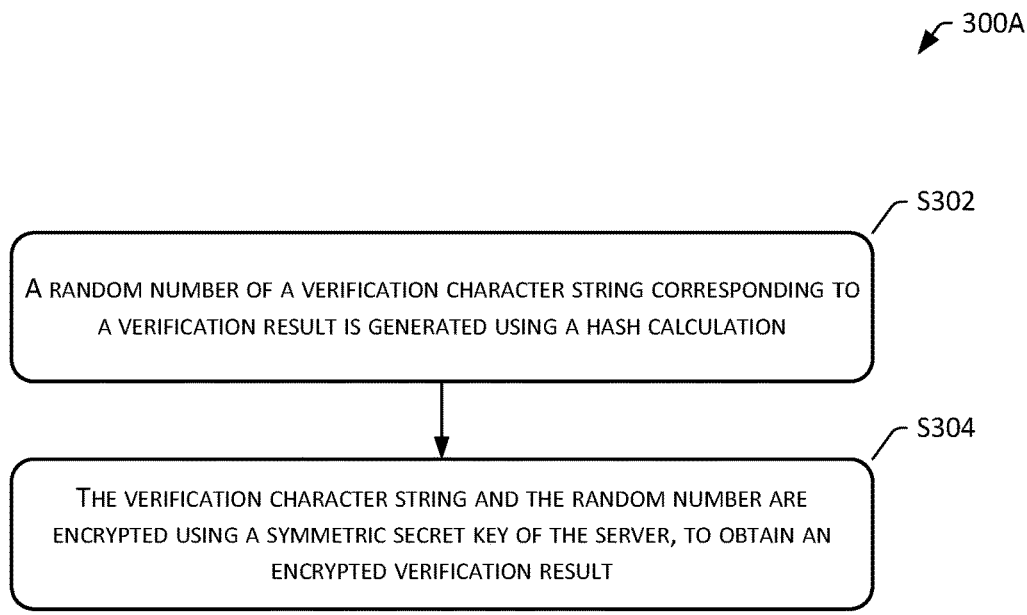
FIG. 3A is a flowchart illustrating a second exemplary method for realizing session identifier synchronization in accordance with an embodiment of the present disclosure.
Figure 3B:
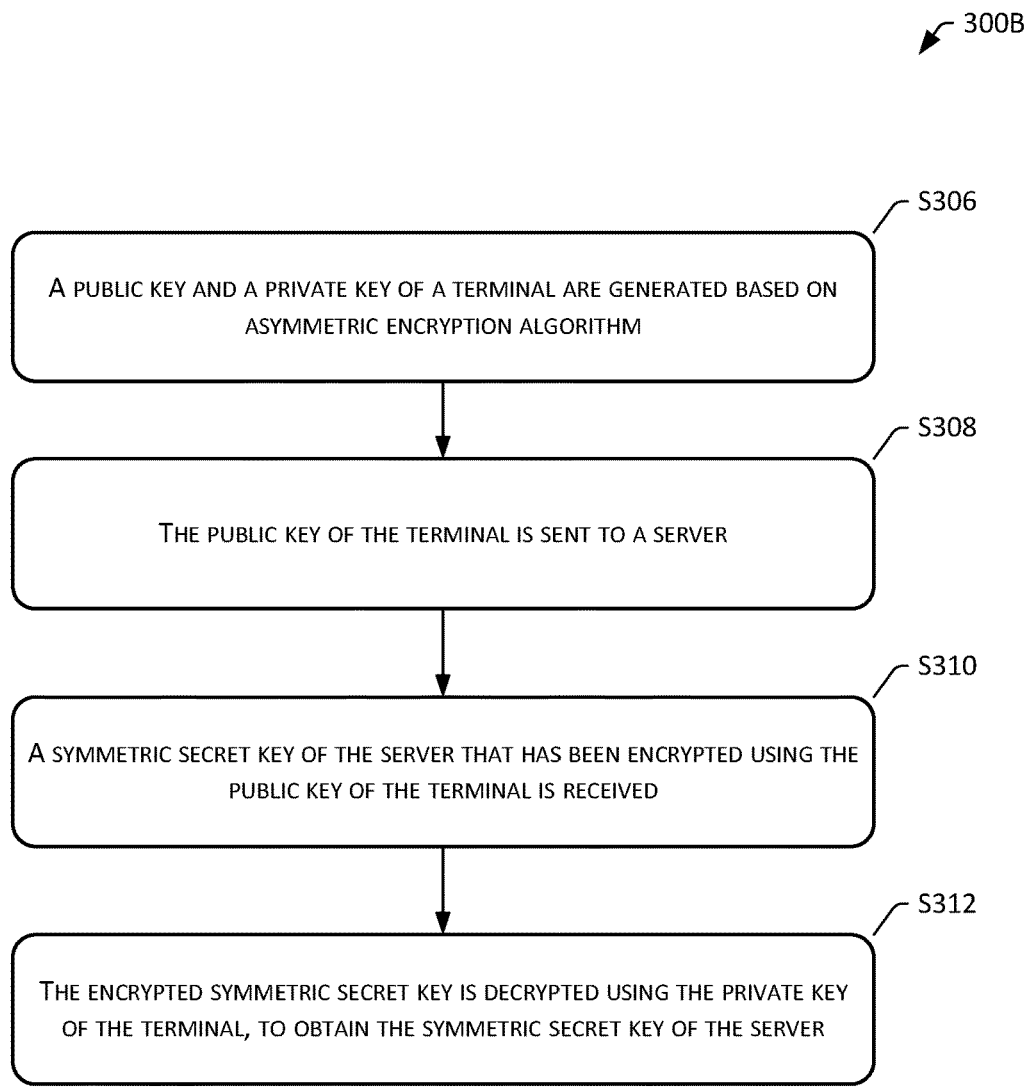
FIG. 3B is a flowchart illustrating how to synchronize a key between a terminal and a server in FIG. 3A.

FIG. 3A is a flowchart illustrating a second exemplary method 300A for realizing session identifier synchronization in accordance with an embodiment of the present disclosure. FIG. 3B is a flowchart illustrating how to synchronize a key between a terminal and a server in FIG. 3A. As shown in FIG. 3A, the following operations are included.

S302: A random number of a verification character string corresponding to a verification result is generated using a hash calculation.

In some embodiments, a terminal and a server may agree on a same hash algorithm, to ensure that the terminal and the server can generate a same random number based on the hash algorithm. In some embodiments, a verification character string in a verification result may be, for example, "001" and "000", wherein "001" represents that verification is passed, and "000" represents that the verification fails.

S304: The verification character string and the random number are encrypted using a symmetric secret key of the server, to obtain an encrypted verification result.

In some embodiments, how the terminal obtains the symmetric secret key of the server can be referenced to a process shown in FIG. 3B. As shown in FIG. 3B, key synchronization 300B between a server and a terminal includes the following operations.

S306: A public key and a private key of a terminal are generated based on asymmetric encryption algorithm.

In some embodiments, the asymmetric encryption algorithm may be, for example, RSA, a knapsack algorithm, Elgamal, D-H, an elliptic curve encryption algorithm (ECC), etc. The present embodiment does not have any limitation on an asymmetric encryption algorithm, provided that a public key and a private key can be generated based on the asymmetric encryption algorithm.

S308: The public key of the terminal is sent to a server.

S310: A symmetric secret key of the server that has been encrypted using the public key of the terminal is received.

In some embodiments, the server generates a symmetric secret key thereof, encrypts the symmetric secret key using the public key of the terminal, and sends the encrypted symmetric secret key to the terminal. Furthermore, the server may also encrypt and store a new password that is modified using the symmetric secret key, thereby avoiding a risk due to a leakage of the new password that is modified by a user through a first terminal as shown in FIG. 1.

S312: The encrypted symmetric secret key is decrypted using the private key of the terminal, to obtain the symmetric secret key of the server.

Through S306-S312, the server is able to obtain the public key of the terminal, and the terminal can obtain the symmetric key of the server, thus realizing a process of key synchronization between the symmetric secret key of the server and the private key of the terminal.

In the present embodiment, the confidentiality of a verification result can be guaranteed through a symmetric encryption technology, and tampering of the verification result by an illegitimate user can be prevented. Using a random number can prevent encrypted data from reuses.

Figure 4:
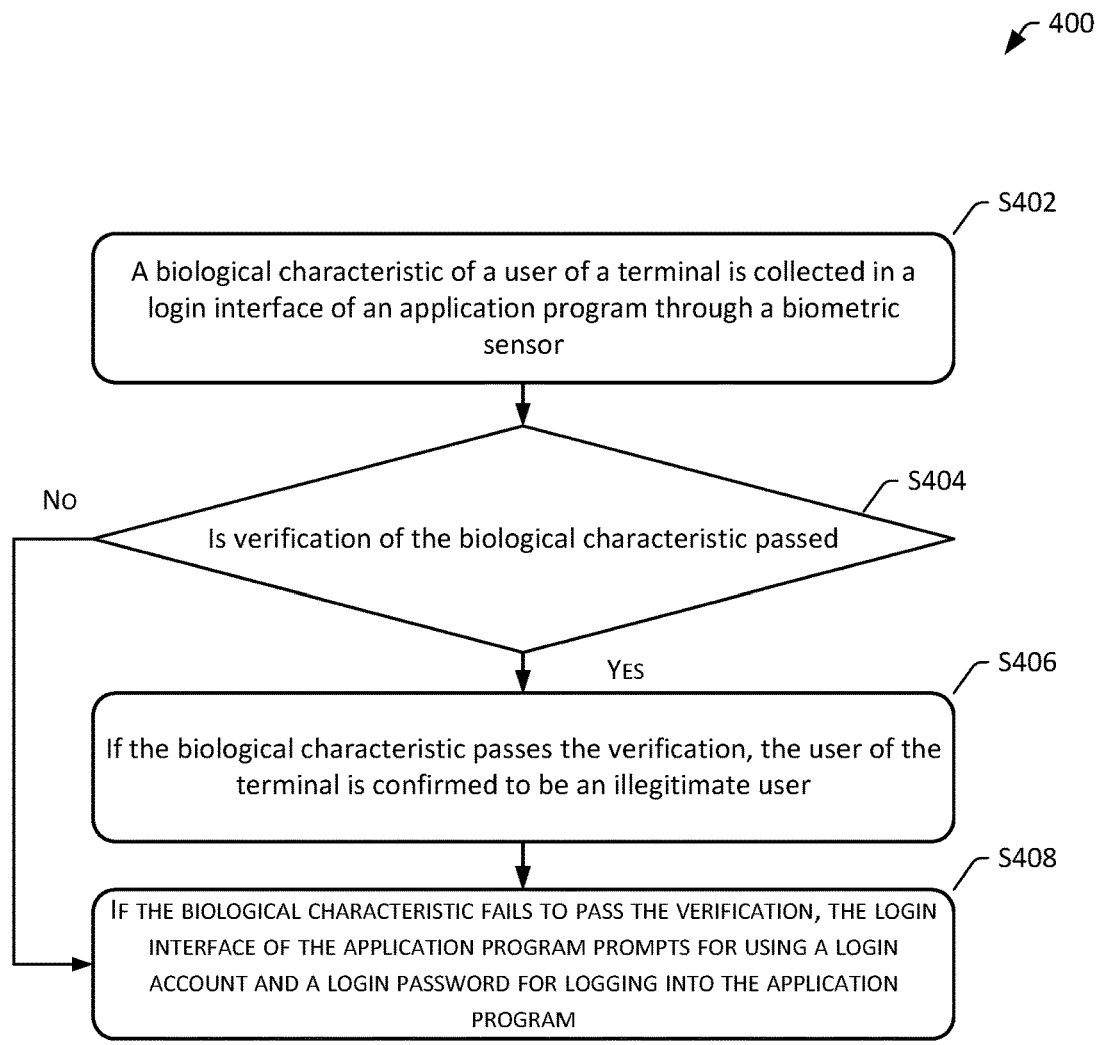
FIG. 4 is a flowchart illustrating a third exemplary method for realizing session identifier synchronization in accordance with an embodiment of the present disclosure.

FIG. 4 is a flowchart illustrating a third exemplary method 400 for realizing session identifier synchronization in accordance with an embodiment of the present disclosure. The present embodiment uses an example of how a terminal performs validity verification on a user locally for explanation. As shown in FIG. 4, the following operations are included.

S402: A biological characteristic of a user of a terminal is collected in a login interface of an application program through a biometric sensor.

In some embodiments, the biological characteristic can be such biological characteristic as a fingerprint, an iris or a human face of the user. If the biological characteristic is a fingerprint, the current login interface of the application program can obtain the fingerprint of the user, thus avoiding the user from leaving the login interface currently displayed by the application program. This achieves performing an operation of fingerprint recognition directly on the login interface, and simplifies the procedure of performing validity verification on the user locally.

S404: Verification is performed on the biological characteristic, to determine whether the verification is passed. If the biological characteristic passes the verification, S406 is performed. If the biological characteristic fails to pass the verification, S408 is performed.

S406: If the biological characteristic passes the verification, the user of the terminal is confirmed to be an illegitimate user.

In some embodiments, verification of a biological characteristic may be referenced to relevant description of existing technologies, and details are not given in the present embodiment.

S408: If the biological characteristic fails to pass the verification, the login interface of the application program prompts for using a login account and a login password for logging into the application program.

In the present embodiment, when a same application program has a large number of users resetting login passwords through ones of a plurality of terminals and logging into the application program through other terminals, the present embodiment can optimize the workload of a server through a local identity verification mechanism, and prevent the server from suffering attacks of distributed denials of services (DDOS) from attackers.

Figure 5:
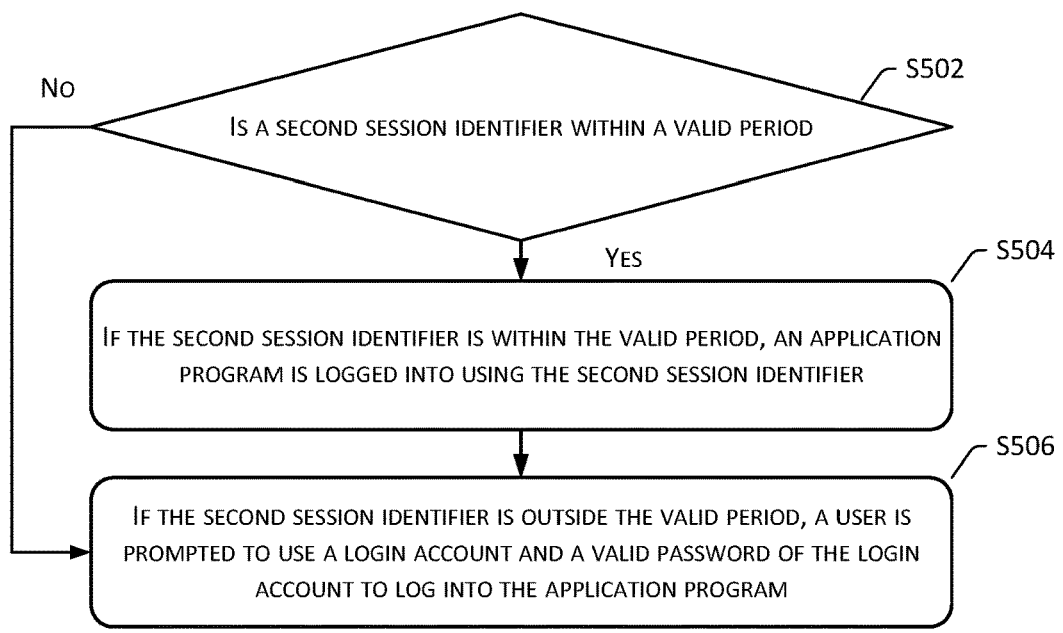
FIG. 5 is a flowchart illustrating a fourth exemplary method for realizing session identifier synchronization in accordance with an embodiment of the present disclosure.

FIG. 5 is a flowchart illustrating a fourth exemplary method 500 for realizing session identifier synchronization in accordance with an embodiment of the present disclosure. After a terminal obtains and stores a second session identifier through the above embodiments, a server can set a valid period for the second session identifier to ensure the security of user login. Therefore, an allotted time for a user to log into an application program is restricted through the valid period of the second session identifier. As shown in FIG. 5, the following operations are included.

S502: A determination is made as to whether a second session identifier is within a valid period, and S504 is performed if the second session identifier is within the valid period, or S506 is performed if the second session identifier is outside the valid period.

S504: If the second session identifier is within the valid period, an application program is logged into using the second session identifier.

S506: If the second session identifier is outside the valid period, a user is prompted to use a login account and a valid password of the login account to log into the application program.

In some embodiments, a valid period can be obtained from a server. For example, a user resets a new password through a first terminal. A time of generation of a second session identifier from the new password by a server is 12:12 on Oct. 10, 2015, and a valid period is one month. The terminal can obtain the time of generation and the valid period of the second session identifier from the server. As such, a determination can be made as to whether the user can directly log into an application program using the second session identifier based on the second session identifier. If the second session identifier is past outside one month, a login interface of the application program can prompt the user that a login account and a valid login password of the login account are needed for logging in the application program.

In the present embodiment, login activities of a user are restricted through a valid period of a second session identifier, thereby preventing an illegitimate user from illegally logging into an application program after obtaining the second session identifier, and ensuring the security of user logins of the application program.

Figure 6:
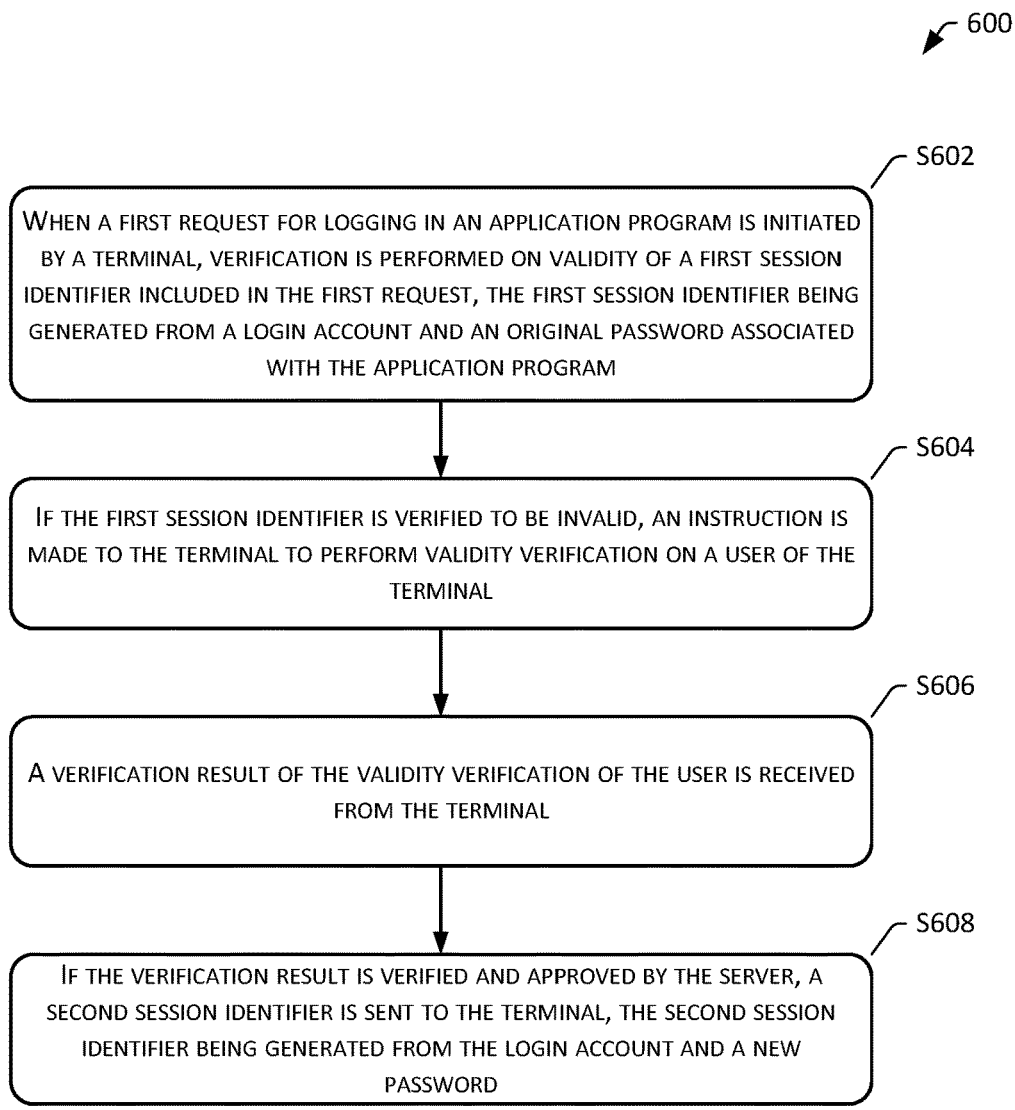
FIG. 6 is a flowchart illustrating a first exemplary method for realizing session identifier synchronization in accordance with another embodiment of the present disclosure.

FIG. 6 is a flowchart illustrating a first exemplary method 600 for realizing session identifier synchronization in accordance with another embodiment of the present disclosure. In order to be consistent with the embodiment shown in FIG. 1, an example of applying the method 600 in a server is used for illustrative description. As shown in FIG. 6, the following operations are included.

S602: When a first request for logging in an application program is initiated by a terminal, verification is performed on validity of a first session identifier included in the first request, the first session identifier being generated from a login account and an original password associated with the application program, and the original password being a login password corresponding to the login account before modification.

In some embodiments, the first session identifier can be compared with a valid session identifier that is stored in a server. If the first session identifier is the same as the valid session identifier that is stored, the first session identifier is determined to be valid. If the first session identifier is not the same as the valid session identifier that is stored, the first session identifier is determined to be invalid.

S604: If the first session identifier is verified to be invalid, an instruction is made to the terminal to perform validity verification on a user of the terminal.

In some embodiments, methods for performing the validity verification of the user of the terminal can be referenced to relevant description of the foregoing embodiments, and are not repeatedly described herein.

S606: A verification result of the validity verification of the user is received from the terminal.

In some embodiments, if a verification result and a random number corresponding to the verification result are encrypted using a symmetric secret key of the server before the terminal sends the verification result to the server, the encrypted verification result is sent to the server. In this case, the server further needs to decrypt the encrypted verification result using the symmetric secret key.

S608: If the verification result is verified and approved by the server, a second session identifier is sent to the terminal, the second session identifier being generated from the login account and a new password, and the new password being a login password corresponding to the login account after the modification.

Through S602-S608, a legitimate user can be allowed to log into the server. Furthermore, the legitimate user can obtain the second session identifier. This prevents the legitimate user from re-inputting the new password to log into the application program when using the terminal, and thus greatly improves the experience of user logins of the application program. After a large number of users need to reset login passwords of an application program, the workload of the server related to verifying user validity can be reduced by performing validity verification on the users on the terminal side, thus avoiding the waste of resources of the server.

Figure 7:
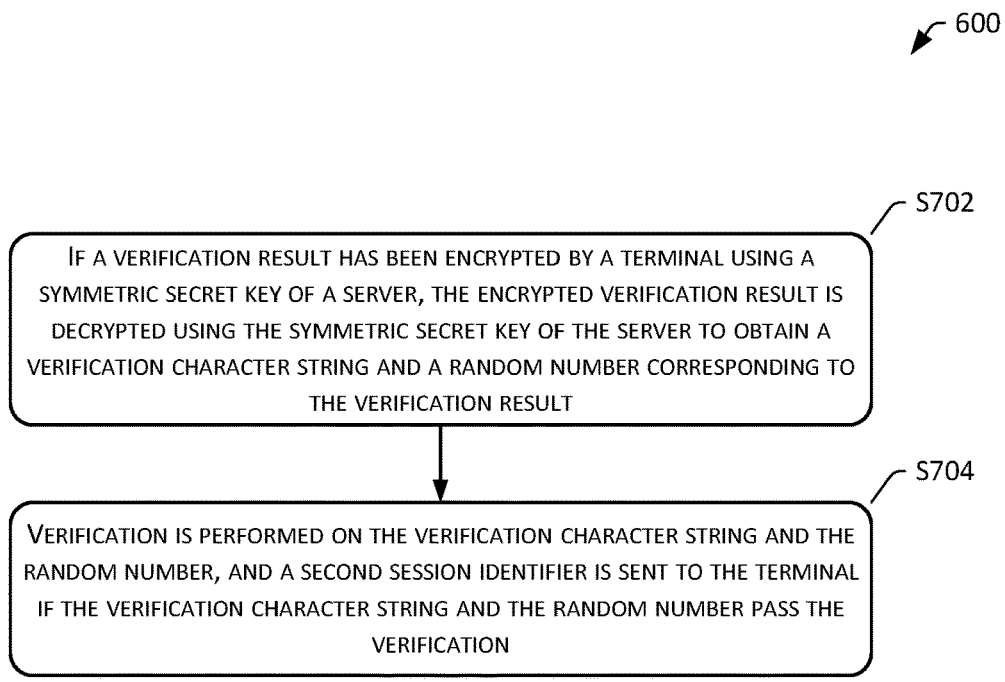
FIG. 7 is a flowchart illustrating a second exemplary method for realizing session identifier synchronization in accordance with another embodiment of the present disclosure.

FIG. 7 is a flowchart illustrating a second exemplary method 700 for realizing session identifier synchronization in accordance with another embodiment of the present disclosure. As shown in FIG. 7, the following operations are included.

S702: If a verification result has been encrypted by a terminal using a symmetric secret key of a server, the encrypted verification result is decrypted using the symmetric secret key of the server to obtain a verification character string and a random number corresponding to the verification result.

S704: Verification is performed on the verification character string and the random number, and a second session identifier is sent to the terminal if the verification character string and the random number pass the verification.

In some embodiments, the terminal and the server may agree on a same hash algorithm, to ensure that the terminal and the server can generate a same random number based on the hash algorithm, and thereby perform a dual verification using the random number. In some embodiments, a verification character string in a verification result may be, for example, "001" and "000", wherein "001" represents that verification is passed, and "000" represents that the verification fails. In some embodiments, the second session identifier can be encrypted using a public key of the terminal, thereby ensuring the security of the second session identifier during a transmission process.

Details about how the terminal obtains the symmetric key of the server and how the server obtains the public key of the terminal can be referenced to the above description of FIG. 3B, and are not repeatedly described herein.

In the present embodiment, the confidentiality of a verification result can be guaranteed through a symmetric encryption technology, and tampering of the verification result by an illegitimate user can be prevented. Using a random number can prevent encrypted data from reuses.

Figure 8:
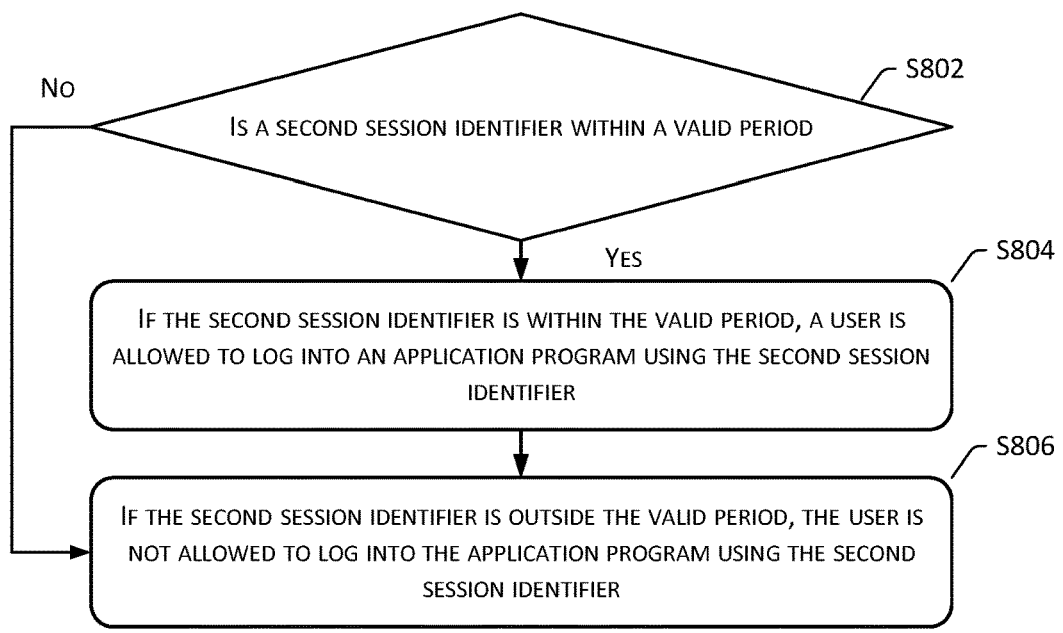
FIG. 8 is a flowchart illustrating a third exemplary method for realizing session identifier synchronization in accordance with another embodiment of the present disclosure.

FIG. 8 is a flowchart illustrating a third exemplary method 800 for realizing session identifier synchronization in accordance with another embodiment of the present disclosure. After a server generates a second session identifier using the above embodiment, the server can set a valid period for the second session identifier in order to ensure the security of user logins. Therefore, an allotted time for a user to log into an application program is restricted through the valid period of the second session identifier. As shown in FIG. 8, the following operations are included.

S802: A determination is made as to whether a second session identifier is within a valid period, and S804 is performed if the second session identifier is within the valid period, or S806 is performed if the second session identifier is outside the valid period.

S804: If the second session identifier is within the valid period, a user is allowed to log into an application program using the second session identifier.

S806: If the second session identifier is outside the valid period, the user is not allowed to log into the application program using the second session identifier.

In some embodiments, a server can determine a valid period of a second session identifier based on an allotted time set by a user. For example, a user resets a new password through a first terminal, and a valid period is one month. A time of generation of a second session identifier from the new password by a server is 12:12 on Oct. 10, 2015, and the server can determine that an expiration time of the second session identifier is 12:12 on Nov. 10, 2015. The user can directly log into the application program using the second session identifier within this allotted time. After the allotted time is past, the user is not allowed to log into the application program using the second session identifier.

In the present embodiment, login activities of a user are restricted through a valid period of a second session identifier, thereby preventing an illegitimate user from illegally logging into an application program after obtaining the second session identifier, and ensuring the security of user logins of the application program.

As an exemplary scenario, if a user logs in an application program through a vehicle-mounted terminal after the user resets a login password of the application program using a mobile phone, the vehicle-mounted terminal has recorded an invalid first session identifier before the user resets the login password. Since a server has set the first session identifier as invalid, the user is therefore not able to log into the application program through the vehicle-mounted terminal. Since the user is driving, the user is therefore not convenient to input a new password. Using the above embodiments for performing biometric verification of the user, a second session identifier can be obtained from the server through the vehicle-mounted terminal upon determining that the user is a legitimate user of the vehicle-mounted terminal. Therefore, the application program is logged into using the second session identifier, thus being able to reduce the risk when the user is driving.

Figure 9:
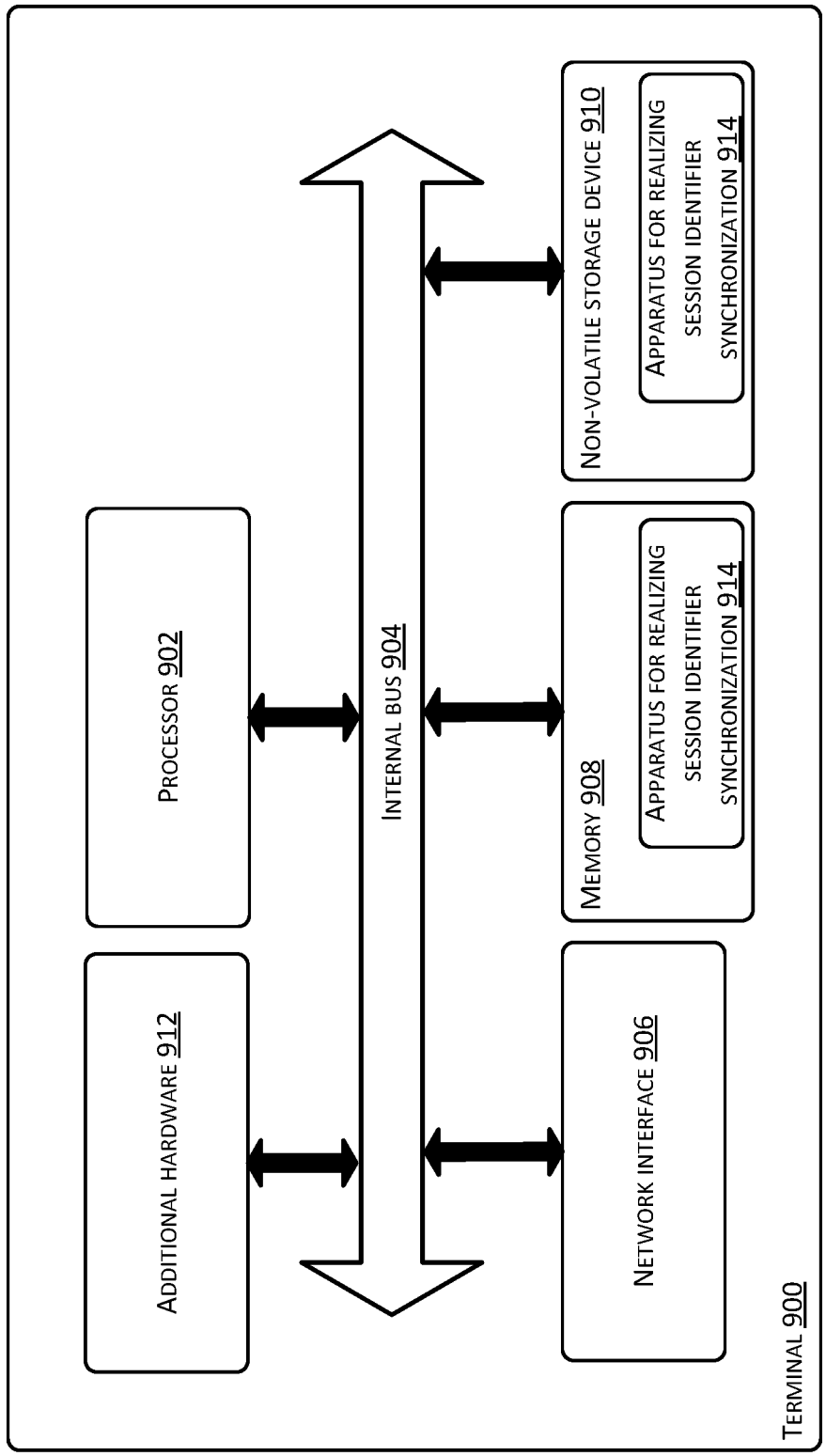
FIG. 9 is a schematic structural of a terminal in accordance with an exemplary embodiment of the present disclosure.

For the above methods of realizing session identifier synchronization, the present disclosure further discloses a schematic structural diagram of a terminal 900 in accordance with an exemplary embodiment of the present disclosure as shown in FIG. 9. Referring to FIG. 9, the terminal 900 may include a processor 902, an internal bus 904, a network interface 906, memory 908, and a non-volatile storage device 910 on a hardware level. Apparently, additional hardware 912 (such as an input/output (i/O) interface, a display, etc.) needed by other services may also be included. The processor 902 reads corresponding computer instructions from the non-volatile storage device 910 into the memory 908 for running, forming an apparatus 914 for realizing session identifier synchronization on a logical level. Apparently, besides software implementations, the present disclosure does not exclude other implementations, such as logical components or a combination of software and hardware, etc. In other words, execution entit(ies) of the following processing procedure is/are not limited to various logical units, and may also be hardware or logical components.

In implementations, the memory 908 may include a form of computer readable media such as a volatile memory, a random access memory (RAM) and/or a non-volatile memory, for example, a read-only memory (ROM) or a flash RAM. The memory 908 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 10:
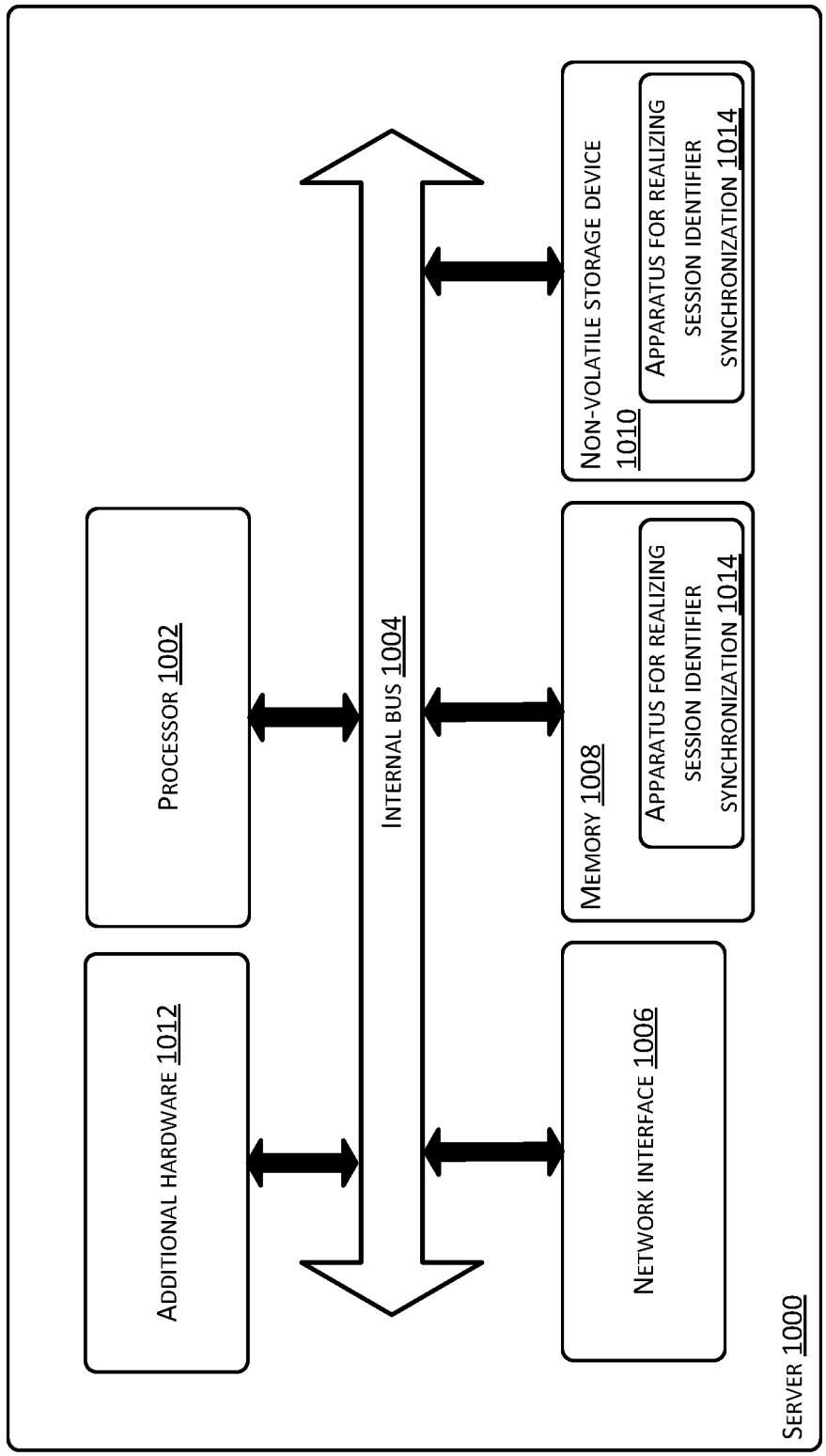
FIG. 10 is a schematic structural diagram of a server in accordance with an exemplary embodiment of the present disclosure.

For the above methods of realizing session identifier synchronization, the present disclosure further discloses a schematic structural diagram of a server 1000 in accordance with an exemplary embodiment of the present disclosure as shown in FIG. 10. Referring to FIG. 10, the server 1000 may include a processor 1002, an internal bus 1004, a network interface 1006, memory 1008, and a non-volatile storage device 1010 on a hardware level. Apparently, additional hardware 1012 (such as an input/output (i/O) interface, a display, etc.) needed by other services may also be included. The processor 1002 reads corresponding computer instructions from the non-volatile storage device 1010 into the memory 1008 for running, forming an apparatus 1014 for realizing session identifier synchronization on a logical level. Apparently, besides software implementations, the present disclosure does not exclude other implementations, such as logical components or a combination of software and hardware, etc. In other words, execution entit(ies) of the following processing procedure is/are not limited to various logical units, and may also be hardware or logical components.

Figure 11:
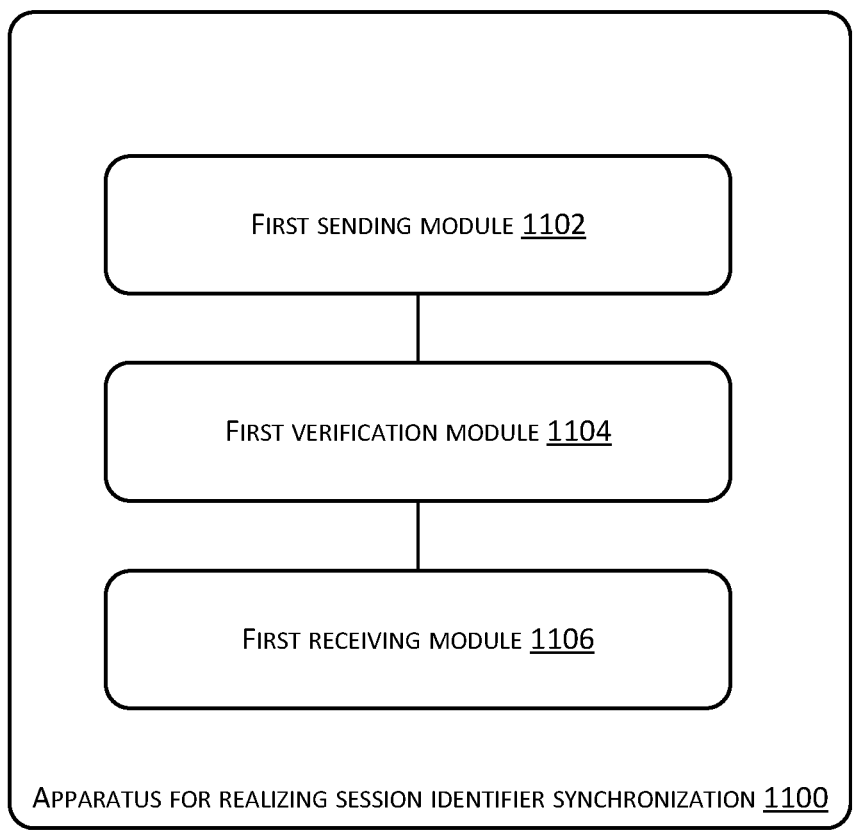
FIG. 11 is a schematic structural diagram of a first exemplary apparatus for realizing session identifier synchronization in accordance with an embodiment of the present disclosure.

FIG. 11 shows a schematic structural diagram of a first exemplary apparatus 1100 for realizing session identifier synchronization in accordance with an embodiment of the present disclosure. As shown in FIG. 11, the apparatus 1100 for realizing session identifier synchronization may include a first sending module 1102, a first verification module 1104, and a first receiving module 1106.

The first sending module 1102 is used for initiating a first request for logging into an application program to a server, the first request including a first session identifier, the first session identifier being generated from a login account and an original password of the application program, and the original password being a login password corresponding to the login account prior to modification.

The first verification module 1104 is used for performing a validity verification on a user of a terminal and sending a verification result that is obtained to the server to allow the server to perform a check on the verification result if the first session identifier sent by the first sending module 1102 is determined to be invalid by the server.

The first receiving module 1106 is used for receiving a second session identifier from the server and storing the second session identifier into the terminal if the verification result that is obtained by the first verification module 1104 is verified and approved by the server, the second session identifier being generated from the login account and a new password, and the new password being a login password corresponding to the login account after the modification.

Figure 12:
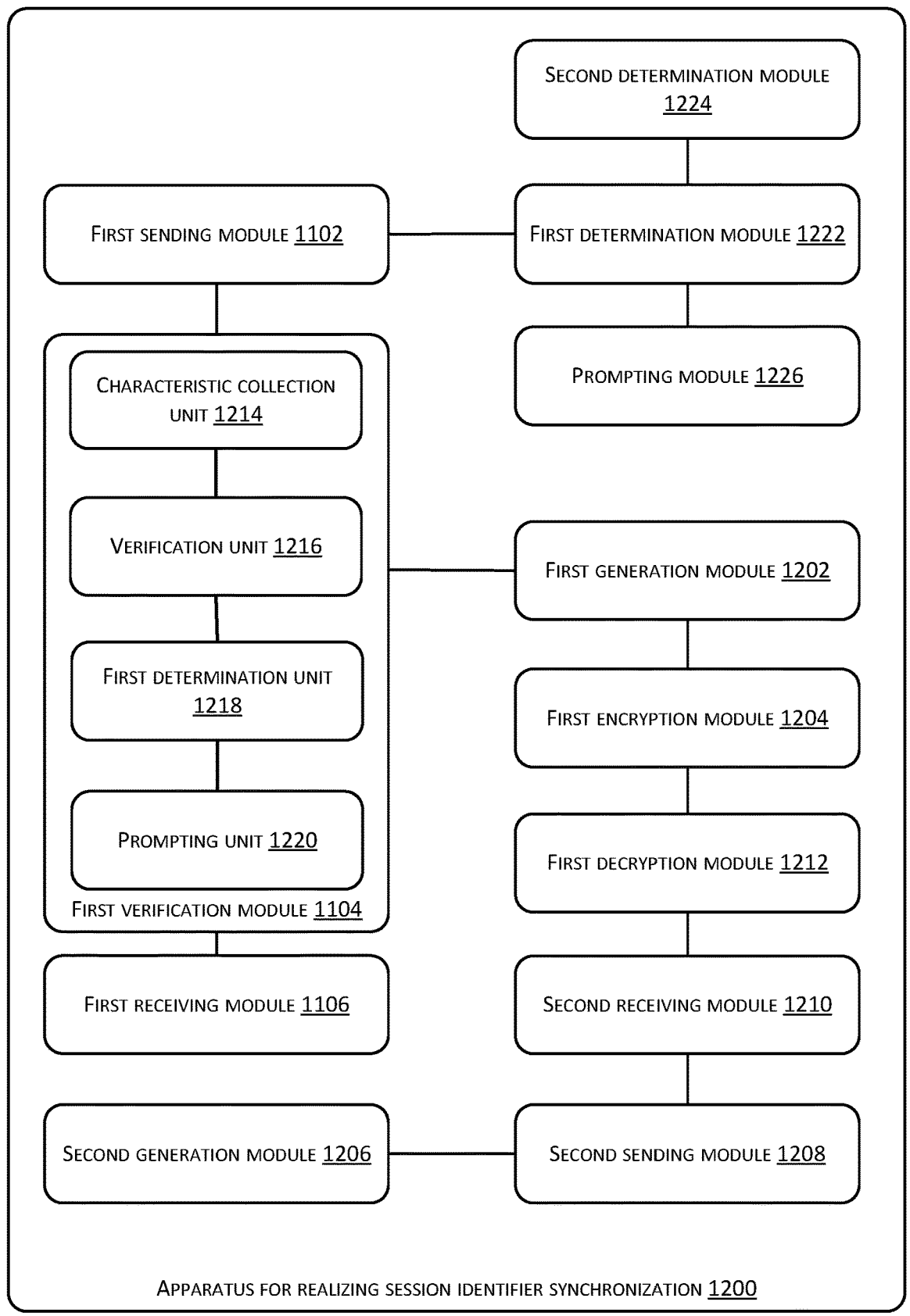
FIG. 12 is a schematic structural diagram of a second exemplary apparatus for realizing session identifier synchronization in accordance with an embodiment of the present disclosure.

FIG. 12 shows a schematic structural diagram of a second exemplary apparatus 1200 for realizing session identifier synchronization in accordance with an embodiment of the present disclosure. In one embodiment, on a basis of the embodiment as shown in FIG. 11, the apparatus as shown in FIG. 12 may further include a first generation module 1202 used for generating a random number of a verification character string corresponding to the verification result obtained by the first verification module 1104; and a first encryption module 1204 used for encrypting the verification character string obtained by the first verification result and the random number generated by the first generation module 1202 using a symmetric secret key of the server, to obtain an encrypted verification result.

In one embodiment, the apparatus may further include a second generation module 1206 used for generating a public key and a private key of the terminal using an asymmetric encryption algorithm; a second sending module 1208 used for sending the public key of the terminal that is generated by the second generation module 1206 to the server; a second receiving module 1210 used for receiving the symmetric secret key of the server that has been encrypted using the public key of the terminal sent by the second sending module 1208 from the server; and a first decryption module 1212 used for decrypting the encrypted symmetric secret key using the private key of the terminal that is generated by the second generation module 1206, to obtain the symmetric secret key of the server.

In some embodiments, the first verification module 1104 may include a characteristic collection unit 1214 used for collecting a biological characteristic of a user of the terminal on a login interface of the application program through a biometric sensor; a verification unit 1216 used for performing verification on the biological characteristic that is collected by the characteristic collection unit 1214; a first determination unit 1218 used for determining that the user of the terminal is a legitimate user if the biological characteristic passes the verification of the verification unit 1216; and a prompting unit 1220 used for providing a prompt on the login interface of the application program for logging in the application program using the login account and the login password.

In some embodiments, the apparatus may further include a first determination module 1222 used for determining whether the second session identifier received by the first receiving module 1106 is within a valid period; a second determination module 1224 used for determining that the second session identifier is used for logging into the application program if the first determination module 1222 determines that the second session identifier is within the valid period; and a prompting module 1226 used for prompting the user to log into the application program using the login account and a valid login password of the login account if the first determination module 1222 determines that the second session identifier is past outside the valid period.

Figure 13:
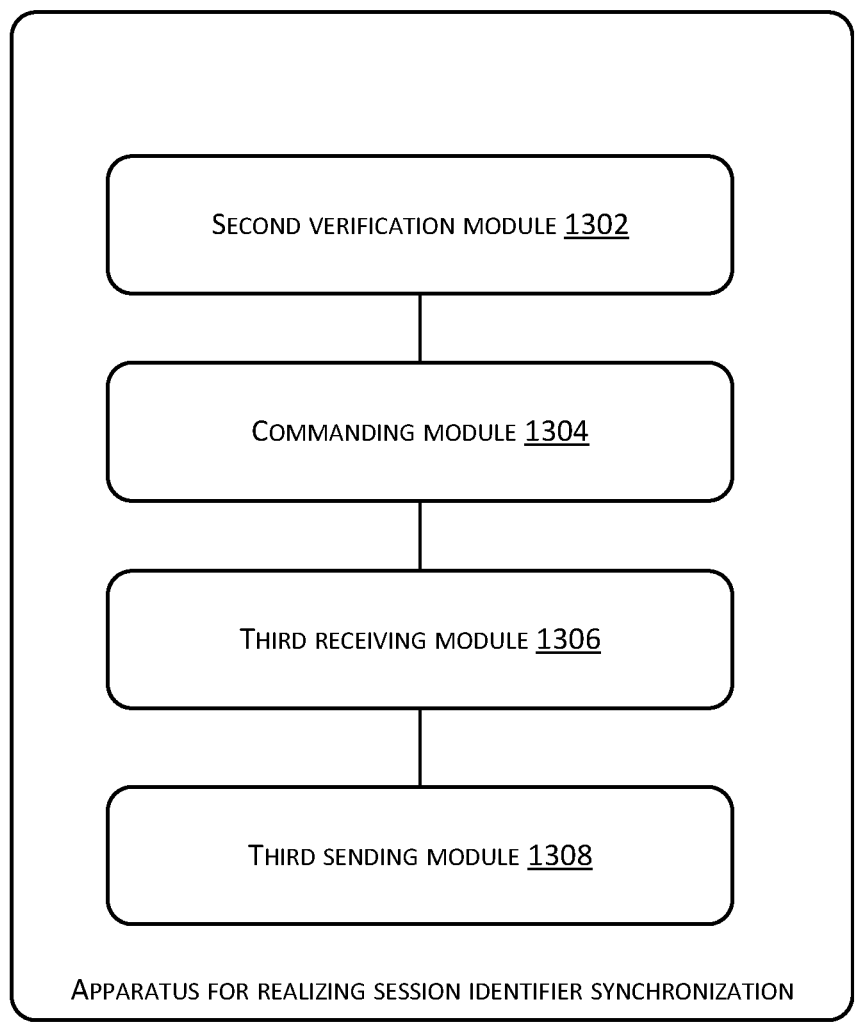
FIG. 13 is a schematic structural diagram of a third exemplary apparatus for realizing session identifier synchronization in accordance with an embodiment of the present disclosure.

FIG. 13 shows a schematic structural diagram of a third exemplary apparatus 1300 for realizing session identifier synchronization in accordance with an embodiment of the present disclosure. As shown in FIG. 13, the apparatus 1300 for realizing session identifier synchronization may include a second verification module 1302, and a commanding module 1304, a third receiving module 1306, and a third sending module 1308.

The second verification module 1302 is used for verifying validity of a first session identifier included in a first request for logging into an application program when the first request is initiated in a terminal, the first session identifier being generated from a login account and an original password of the application program, and the original password being a login password corresponding to the login account prior to modification.

The commanding module 1304 is used for instructing the terminal to perform validity verification on a user of the terminal if the first session identifier is verified to be invalid by the second verification module 1302.

The third receiving module 1306 is used for receiving a verification result of the validity verification of the user that is performed by the terminal according to an instruction of the commanding module 1304.

The third sending module 1308 is used for sending a second session identifier to the terminal if the verification result that is received by the third receiving module 1308 is verified and approved by a server, the second session identifier being generated from the login account and a new password, and the new password being a login password corresponding to the login account after the modification.

Figure 14:
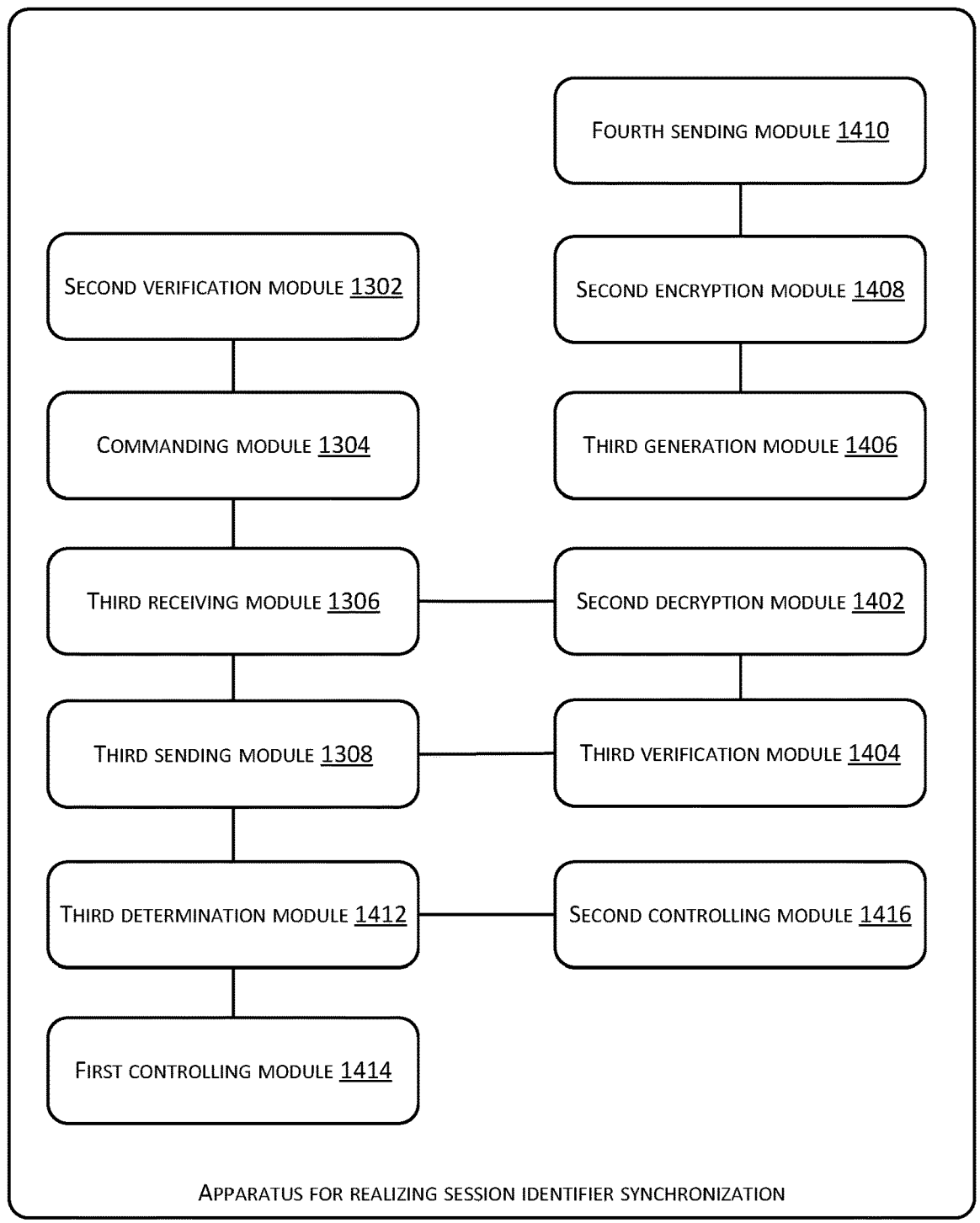
FIG. 14 is a schematic structural diagram of a fourth exemplary apparatus for realizing session identifier synchronization in accordance with an embodiment of the present disclosure.

FIG. 14 shows a schematic structural diagram of a fourth exemplary apparatus 1400 for realizing session identifier synchronization in accordance with an embodiment of the present disclosure. In one embodiment, on a basis of the embodiment as shown in FIG. 13, the apparatus 1400 as shown in FIG. 14 may further include a second decryption module 1402 used for decrypting an encrypted verification result using a symmetric secret key of the server to obtain a verification character string corresponding to the verification result and a random number if the verification result obtained by the third receiving module 1306 has been encrypted by the terminal using the symmetric secret key of the server; and a third verification module 1404 used for performing verification on the verification character string and the random number that are obtained after decryption by the second decryption module 1402. If the verification character string and the random number pass the verification, the third sending module 1308 performs the operation of sending the second session identifier to the terminal.

In some embodiments, the apparatus may further include a third generation module 1406 used for generating the symmetric secret key of the server based on a symmetric encryption algorithm, to enable the second decryption module 1402 to decrypt the encrypted verification result using the symmetric secret key of the server; a second encryption module 1408 used for encrypting the symmetric secret key generated by the third generation module 1406 using a public key of the terminal; and a fourth sending module 1410 used for sending the symmetric secret key encrypted by the second encryption module 1408 to the terminal, to allow the terminal to use a private key corresponding to the public key to decrypt the symmetric secret key that is encrypted, to obtain the symmetric key of the server.

In some embodiments, the apparatus may further include a third determination module 1412 used for determining whether the second session identifier sent by the third sending module 1308 is within a valid period; a first controlling module 1414 used for allowing the user to log into the application program using the second session identifier if the third determination module 140 determines that the second session identifier is within the valid period; and a second controlling module 1416 used for forbidding the user to log into the application program using the second session identifier if the third determination module 1412 determines that the second session identifier is past outside the valid period.

Figure 15:
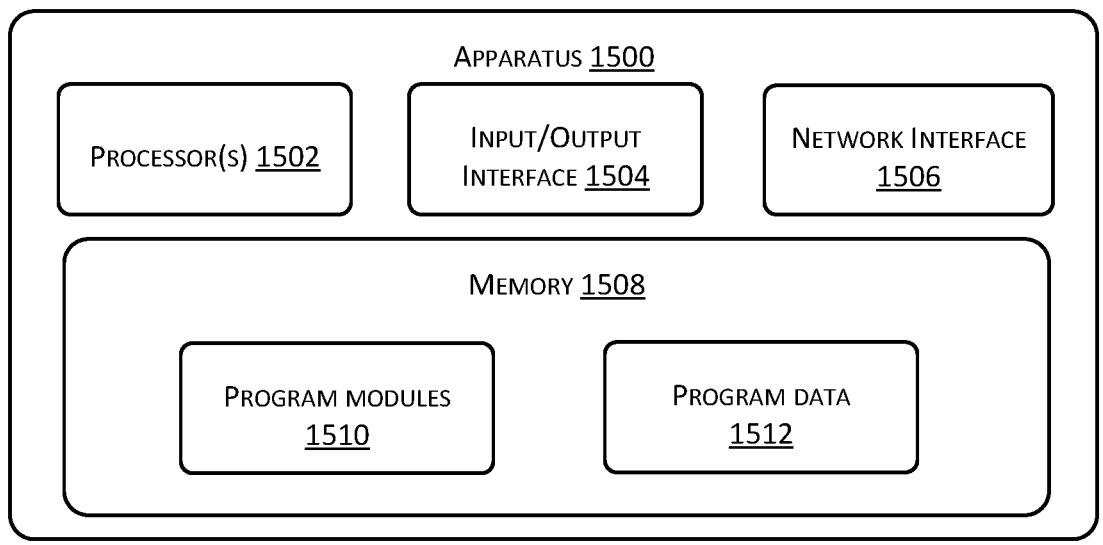
FIG. 15 is a schematic structural diagram of the apparatuses as described in FIGS. 11-14 in further detail.

FIG. 15 shows an exemplary apparatus 1500 such as the apparatuses 1100-1400 in further detail. In implementations, the apparatus 1500 may include one or more processors 1502, an input/output interface 1504, a network interface 1506, and memory 1508.

In implementations, the memory 1508 may include a form of computer readable media such as a volatile memory, a random access memory (RAM) and/or a non-volatile memory, for example, a read-only memory (ROM) or a flash RAM. The memory 1508 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1508 may include program modules 1510 and program data 1512. Depending on which apparatus (such as apparatuses 1100-1400) the apparatus 1500 corresponds to, the program module 1510 may include one or more of the foregoing modules and/or units of any of the apparatuses 1100-1400 as described in the foregoing description.

As can be seen from the above embodiments, when a user logs in an application program through a second terminal after the user modifies a login password of the application program on a first terminal, this same user can be allowed to log into the application program in the second terminal that is different from the first terminal, thus avoiding a manner of inputting the modified login password to log into the application program. Therefore, the user experience is improved, and the security of logins is guaranteed.

One skilled in the art can easily think of other implementations of the present disclosure after considering the specification and practicing the invention disclosed herein. The present disclosure is intended to cover any modifications, uses or adaptive changes. These modifications, uses or adaptive changes follow common principles of the present disclosure, and include well-known knowledge or common technical measures in the current technical field that is/are not described in the present disclosure. The specification and the embodiments are viewed as exemplary only. The actual scope and the spirit of the present disclosure are indicated by the appended claims.

It is also noted that terms "include", "contain", or any other variations are intended to cover non-exclusive inclusion. Therefore, A process, method, product or device that includes a series of elements not only includes these elements, but also includes other elements that are not explicitly listed, or may further include elements that are inherent in the process, method, product or device. Without further limitations, an element defined by a statement "including a . . . " does not exclude a further addition of the same element in a process, method, product or device including this element.

The above description refers to exemplary embodiments of the present disclosure only, and is not used as a limitation to the present disclosure. Any modifications, equivalent replacements, improvements, etc., that are made in the spirit and the principles of the present disclosure shall all be included in the scope of protection of the present disclosure.

The present disclosure may be further understood with clauses as follows.

Clause 1: A method for realizing a session identifier synchronization, which is applied in a terminal, wherein the method comprises: initiating a first request for logging into an application program to a server, the first request including a first session identifier, the first session identifier being generated from a login account and an original password of the application program, and the original password being a login password corresponding to the login account prior to modification; performing a validity verification on a user of the terminal and sending a verification result that is obtained to the server to allow the server to perform a check on the verification result if the first session identifier is determined to be invalid by the server; and receiving a second session identifier from the server and storing the second session identifier into the terminal if the verification result is verified and approved by the server, the second session identifier being generated from the login account and a new password, and the new password being a login password corresponding to the login account after the modification.

Clause 2: The method of Clause 1, wherein the method further comprises: generating a random number of a verification character string corresponding to the verification result through a hash algorithm; and encrypting the verification character string and the random number using a symmetric secret key of the server to obtain an encrypted verification result.

Clause 3: The method of Clause 2, wherein the method further comprises: generating a public key and a private key of the terminal based on an asymmetric encryption algorithm; sending the public key of the terminal to the server; receiving a symmetric secret key of the server that is encrypted using the public key of the terminal from the server; and decrypting the symmetric secret key that is encrypted using the private key of the terminal to obtain the symmetric secret key of the server.

Clause 4: The method of Clause 1, wherein performing the validity verification on the user of the terminal comprises: collecting a biological characteristic of the user of the terminal on a login interface of the application program using a biometric sensor; performing a verification on the biological characteristic; determining that the user of the terminal is a legitimate user if the biological characteristic passes the verification; and providing a prompt on the login interface of the application program for logging into the application program using the login account and the login password if the biological characteristic fails to pass the verification.

Clause 5: The method of any one of Clause 1-4, wherein the method further comprises: determining whether the second session identifier is within a valid period; determining that the application program is logged in using the second session identifier if the second session identifier is within the valid period; and prompting a user to log into the application program using the login account and a valid login password of the login account if the second session identifier is past outside the valid period.

Clause 6: A method for realizing a session identifier synchronization, which is applied in a server, wherein the method comprises: verifying validity of a first session identifier included in a first request for logging into an application program when the first request is initiated in a terminal, the first session identifier being generated from a login account and an original password of the application program, and the original password being a login password corresponding to the login account prior to modification; instructing the terminal to perform a validity verification on a user of the terminal if the first session identifier is verified to be invalid; receiving a verification result of the validity verification of the user from the terminal; and sending a second session identifier to the terminal if the verification result is verified and approved by the server, the second session identifier being generated from the login account and a new password, and the new password being a login password corresponding to the login account after the modification.

Clause 7: The method of Clause 6, wherein the method further comprises: decrypting an encrypted verification result using a symmetric secret key of the server to obtain a verification character string and a random number corresponding to the verification result if the verification result is encrypted by the terminal using the symmetric secret key of the server; performing a verification on the verification character string and the random number; and sending the second session identifier to the terminal if the verification character string and the random number passes the verification.

Clause 8: The method of Clause 7, wherein the method further comprises: generating the symmetric secret key of the server based on a symmetric encryption algorithm; encrypting the symmetric secret key using a public key of the terminal; and sending the encrypted symmetric secret key to the terminal to allow the terminal to decrypt the encrypted symmetric secret key using a private key corresponding to the public key to obtain the symmetric secret key of the server.

Clause 9: The method of any one of Clause 6-8, wherein the method further comprises: determining whether the second session identifier is within a valid period; allowing the user to log into the application program through the second session identifier if the second session identifier is within the valid period; and forbidding the user to log into the application program through the second session identifier if the second session identifier is past outside the valid period.

Clause 10: An apparatus for realizing a session identifier synchronization, the apparatus comprising: a first sending module used for initiating a first request for logging into an application program to a server, the first request including a first session identifier, the first session identifier being generated from a login account and an original password of the application program, and the original password being a login password corresponding to the login account prior to modification; a first verification module used for performing a validity verification on a user of a terminal and sending a verification result that is obtained to the server to allow the server to perform a check on the verification result if the first session identifier sent by the first sending module is determined to be invalid by the server; and a first receiving module used for receiving a second session identifier from the server and storing the second session identifier into the terminal if the verification result that is obtained by the first verification module is verified and approved by the server, the second session identifier being generated from the login account and a new password, and the new password being a login password corresponding to the login account after the modification.

Clause 11: The apparatus of Clause 10, wherein the apparatus further comprises: a first generation module used for generating a random number of a verification character string corresponding to the verification result obtained by the first verification module; and a first encryption module used for encrypting the verification character string obtained by the first verification result and the random number generated by the first generation module using a symmetric secret key of the server, to obtain an encrypted verification result.

Clause 12: The apparatus of Clause 11, wherein the apparatus further comprises: a second generation module used for generating a public key and a private key of the terminal using an asymmetric encryption algorithm; a second sending module used for sending the public key of the terminal that is generated by the second generation module to the server; a second receiving module used for receiving the symmetric secret key of the server that has been encrypted using the public key of the terminal sent by the second sending module from the server; and a first decryption module used for decrypting the encrypted symmetric secret key using the private key of the terminal that is generated by the second generation module, to obtain the symmetric secret key of the server.

Clause 13: The apparatus of Clause 10, wherein the first verification module comprises: a characteristic collection unit used for collecting a biological characteristic of a user of the terminal on a login interface of the application program through a biometric sensor; a verification unit used for performing verification on the biological characteristic that is collected by the characteristic collection unit; a first determination unit used for determining that the user of the terminal is a legitimate user if the biological characteristic passes the verification of the verification unit; and a prompting unit used for providing a prompt on the login interface of the application program for logging in the application program using the login account and the login password.

Clause 14: The apparatus of any one of claims 10-13, wherein the apparatus further comprises: a first determination module used for determining whether the second session identifier received by the first receiving module is within a valid period; a second determination module used for determining that the second session identifier is used for logging into the application program if the first determination module determines that the second session identifier is within the valid period; and a prompting module used for prompting the user to log into the application program using the login account and a valid login password of the login account if the first determination module 120 determines that the second session identifier is past outside the valid period.

Clause 15: An apparatus for realizing session identifier synchronization, the apparatus comprising: a second verification module used for verifying validity of a first session identifier included in a first request for logging into an application program when the first request is initiated in a terminal, the first session identifier being generated from a login account and an original password of the application program, and the original password being a login password corresponding to the login account prior to modification; a commanding module used for instructing the terminal to perform a validity verification on a user of the terminal if the first session identifier is verified by the second verification module to be invalid; a third receiving module used for receiving a verification result of the validity verification of the user that is performed by the terminal according to an instruction of the commanding module; and a third sending module used for sending a second session identifier to the terminal if the verification result that is received by the third receiving module is verified and approved by a server, the second session identifier being generated from the login account and a new password, and the new password being a login password corresponding to the login account after the modification.

Clause 16: The apparatus of Clause 15, wherein the apparatus further comprises: a second decryption module used for decrypting an encrypted verification result using a symmetric secret key of the server to obtain a verification character string corresponding to the verification result and a random number if the verification result obtained by the third receiving module has been encrypted by the terminal using the symmetric secret key of the server; and a third verification module used for performing verification on the verification character string and the random number that are obtained after decryption by the second decryption module, wherein the third sending module sends the second session identifier to the terminal if the verification character string and the random number pass the verification.

Clause 17: The apparatus of Clause 16, wherein the apparatus further comprises: a third generation module used for generating the symmetric secret key of the server based on a symmetric encryption algorithm, to enable the second decryption module to decrypt the encrypted verification result using the symmetric secret key of the server; a second encryption module used for encrypting the symmetric secret key generated by the third generation module using a public key of the terminal; and a fourth sending module used for sending the symmetric secret key encrypted by the second encryption module to the terminal, to allow the terminal to use a private key corresponding to the public key to decrypt the symmetric secret key that is encrypted, to obtain the symmetric key of the server.

Clause 18: The apparatus of any one of Clause 15-17, wherein the apparatus further comprises: a third determination module used for determining whether the second session identifier sent by the third sending module is within a valid period; a first controlling module used for allowing the user to log into the application program using the second session identifier if the third determination module determines that the second session identifier is within the valid period; and a second controlling module used for forbidding the user to log into the application program using the second session identifier if the third determination module 140 determines that the second session identifier is past outside the valid period.

What is claimed is:

1. A method for realizing session identifier synchronization when a password change occurs, the method comprising:
   initiating a first request for logging into an application program from a terminal to a server, the first request including a first session identifier, the first session identifier being generated from a login account and an original password of the application program;
   when the original password has been modified into a new password for logging into the login account of the application program:
      performing validity verification on a user of the terminal and sending a verification result that is obtained to the server to allow the server to perform a check on the verification result; and
      receiving a second session identifier from the server and storing the second session identifier into a terminal if the verification result is verified and approved by the server, the second session identifier being different from the first session identifier and being generated from the login account and the new password;
   determining whether the second session identifier is within a valid period;
   determining that the application program is logged in using the second session identifier if the second session identifier is within the valid period; and
   prompting the user to log into the application program using the login account and a valid login password of the login account if the second session identifier is past outside the valid period.

2. The method of claim 1, further comprising:
   generating a random number of a verification character string corresponding to the verification result; and
   encrypting the verification character string and the random number using a symmetric secret key of the server to obtain an encrypted verification result.

3. The method of claim 2, wherein the random number is generated using a hash algorithm.

4. The method of claim 1, further comprising:
   generating a public key and a private key of the terminal based on an asymmetric encryption algorithm; and
   sending the public key of the terminal to the server.

5. The method of claim 4, further comprising:
   receiving an encrypted symmetric secret key of the server from the server, the encrypted symmetric secret key being encrypted using the public key of the terminal; and
   decrypting the encrypted symmetric secret key using the private key of the terminal to obtain a symmetric secret key of the server.

6. The method of claim 1, wherein performing the validity verification on the user of the terminal comprises:
   collecting a biological characteristic of the user of the terminal on a login interface of the application program using a biometric sensor;
   performing verification on the biological characteristic;
   determining that the user of the terminal is a legitimate user if the biological characteristic passes the verification; and
   providing a prompt on the login interface of the application program for logging into the application program using the login account and the new password if the biological characteristic fails to pass the verification.

7. One or more computer-readable media storing executable instructions that, when executed by one or more processors of a terminal, cause the one or more processors to perform acts for realizing session identifier synchronization when a password change occurs, the acts comprising:
   initiating a first request for logging into an application program to a server, the first request including a first session identifier, the first session identifier being generated from a login account and an original password of the application program;
   when the original password has been modified into a new password for logging into the login account of the application program:
      performing validity verification on a user of the terminal and sending a verification result that is obtained to the server to allow the server to perform a check on the verification result; and
      receiving a second session identifier from the server and storing the second session identifier into the terminal if the verification result is verified and approved by the server, the second session identifier being different from the first session identifier and being generated from the login account and the new password;
   determining whether the second session identifier is within a valid period;
   determining that the application program is logged in using the second session identifier if the second session identifier is within the valid period; and
   prompting the user to log into the application program using the login account and a valid login password of the login account if the second session identifier is past outside the valid period.

8. The one or more computer-readable media of claim 7, the acts further comprising:
   generating a random number of a verification character string corresponding to the verification result; and
   encrypting the verification character string and the random number using a symmetric secret key of the server to obtain an encrypted verification result.

9. The one or more computer-readable media of claim 8, wherein the random number is generated using a hash algorithm.

10. The one or more computer-readable media of claim 7, the acts further comprising:
generating a public key and a private key of the terminal based on an asymmetric encryption algorithm; and
sending the public key of the terminal to the server.

11. The one or more computer-readable media of claim 10, the acts further comprising:
receiving an encrypted symmetric secret key of the server from the server, the encrypted symmetric secret key being encrypted using the public key of the terminal; and
decrypting the encrypted symmetric secret key using the private key of the terminal to obtain a symmetric secret key of the server.

12. The one or more computer-readable media of claim 7, wherein performing the validity verification on the user of the terminal comprises:
collecting a biological characteristic of the user of the terminal on a login interface of the application program using a biometric sensor;
performing verification on the biological characteristic;
determining that the user of the terminal is a legitimate user if the biological characteristic passes the verification; and
providing a prompt on the login interface of the application program for logging into the application program using the login account and the new password if the biological characteristic fails to pass the verification.

13. An apparatus for realizing session identifier synchronization when a password change occurs, the apparatus comprising:
one or more processors;
memory storing executable instructions that, when executed by the one or more processors, cause the one or more processors to perform acts comprising:
verifying validity of a first session identifier included in a first request for logging into an application program when the first request is initiated in a terminal, the first session identifier being generated from a login account and an original password of the application program;
when the original password has been modified into a new password for logging into the login account of the application program:
determining that the first session identifier is invalid;
instructing the terminal to perform validity verification on a user of the terminal;
receiving a verification result of the validity verification of the user that is performed by the terminal;
sending a second session identifier to the terminal to enable the terminal to log into the login account of the application program without receiving the new password from the terminal if the verification result is verified and approved by a server, the second session identifier being generated from the login account and the new password; and
sending information of a valid period to the terminal to enable the terminal to determine whether the second session identifier is within the valid period, determine that the application program is logged in using the second session identifier if the second session identifier is within the valid period, and prompt the user to log into the application program using the login account and a valid login password of the login account if the second session identifier is past outside the valid period.

14. The apparatus of claim 13, the acts further comprising:
decrypting an encrypted verification result using a symmetric secret key of the server to obtain a verification character string corresponding to the verification result and a random number if the verification result has been encrypted by the terminal using the symmetric secret key of the server; and
performing verification on the verification character string and the random number that are obtained after decryption, wherein the second session identifier is sent to the terminal in response to the verification character string and the random number passing the verification.

15. The apparatus of claim 13, the acts further comprising:
generating the symmetric secret key of the server based on a symmetric encryption algorithm, to enable a decryption of the encrypted verification result using the symmetric secret key of the server;
encrypting the symmetric secret key using a public key of the terminal; and
sending the encrypted symmetric secret key to the terminal, to allow the terminal to use a private key corresponding to the public key to decrypt the symmetric secret key that is encrypted, to obtain the symmetric key of the server.

* * * * *